United States Patent
Takacs et al.

(10) Patent No.: US 8,374,737 B2
(45) Date of Patent: Feb. 12, 2013

(54) LOW VISIBILITY LANDING SYSTEM AND METHOD

(75) Inventors: Robert S. Takacs, Richmond Hill, GA (US); Gary M. Freeman, Savannah, GA (US); Glenn L. Connor, Laurel, MD (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 13/243,698

(22) Filed: Sep. 23, 2011

(65) Prior Publication Data
US 2012/0065817 A1    Mar. 15, 2012

Related U.S. Application Data

(63) Continuation of application No. 12/611,645, filed on Nov. 3, 2009, now abandoned.

(51) Int. Cl.
*G06F 19/00* (2011.01)

(52) U.S. Cl. ......... 701/17; 700/3; 700/4; 700/9; 700/11; 700/14; 700/16; 700/120; 700/200; 700/207; 700/208; 340/961; 340/960; 340/970; 340/980; 342/33; 342/35; 342/36; 342/38; 342/58; 244/189; 73/178 H

(58) Field of Classification Search ............... 700/3, 4, 700/9, 11, 14, 16, 120, 200, 207, 208, 301; 340/961, 960, 970, 980; 342/33, 35, 36, 342/38, 58, 357.31, 455; 235/61 NV, 78 N; 244/17.13, 189; 73/178 H
See application file for complete search history.

(56) References Cited

U.S. PATENT DOCUMENTS

| | | | |
|---|---|---|---|
| 4,916,612 A | 4/1990 | Chin et al. | |
| 5,113,346 A | 5/1992 | Orgun et al. | |
| 5,182,514 A | 1/1993 | Rice, Jr. | |
| 5,754,053 A | 5/1998 | Bourdeau | |
| 5,820,080 A | 10/1998 | Eschenbach | |
| 6,311,108 B1 | 10/2001 | Ammar et al. | |
| 6,529,820 B2* | 3/2003 | Tomescu | 701/120 |
| 6,965,816 B2* | 11/2005 | Walker | 701/16 |
| 7,089,092 B1 | 8/2006 | Wood et al. | |
| 7,546,183 B1 | 6/2009 | Marcum | |
| 7,555,372 B2 | 6/2009 | Dywer | |

(Continued)

FOREIGN PATENT DOCUMENTS
EP    0498655 A2    8/1992

OTHER PUBLICATIONS

International Search Report mailed Jul. 1, 2011 in PCT/US2010/055144.

*Primary Examiner* — James Trammell
*Assistant Examiner* — McDieunel Marc
(74) *Attorney, Agent, or Firm* — Ingrassia Fisher & Lorenz, P.C.

(57) ABSTRACT

A low visibility landing system is provided for guiding aircraft on landing approaches. The low visibility landing system may aid a pilot during landing in low visibility conditions such that an aircraft may descend to lower altitudes without visual contact with the runway than is possible with other landing systems. The system may use various navigational systems to produce a hybrid signal that may be more stable than individual signals of those navigational systems. The hybrid signal is compared to a predetermined landing approach plan to determine the deviation of the aircraft from the landing approach plan and to provide guidance to the pilot to get the aircraft back onto the landing approach plan. The system may also use multiple navigational systems to perform checks on an operation of a primary navigational system to ensure that the primary navigational system is operating accurately.

25 Claims, 8 Drawing Sheets

U.S. PATENT DOCUMENTS

| | | | |
|---|---|---|---|
| 7,693,621 B1* | 4/2010 | Chamas | 701/16 |
| 7,920,943 B2* | 4/2011 | Campbell et al. | 701/9 |
| 2002/0147542 A1* | 10/2002 | Tomescu | 701/120 |
| 2005/0187677 A1* | 8/2005 | Walker | 701/16 |
| 2008/0255715 A1 | 10/2008 | Elchynski | |
| 2009/0254276 A1 | 10/2009 | Faulkner et al. | |
| 2011/0106345 A1* | 5/2011 | Takacs et al. | 701/17 |
| 2011/0213514 A1* | 9/2011 | Baxter | 701/14 |

* cited by examiner

LOW VISIBILITY LANDING SYSTEM AND METHOD

CROSS-REFERENCE TO RELATED APPLICATIONS

This application is a continuation of U.S. patent application Ser. No. 12/611,645, file Nov. 3, 2009, which is incorporated herein in its entirety by reference.

TECHNICAL FIELD

Embodiments relate to aircraft landing systems and, more particularly, to landing systems used in low visibility conditions.

BACKGROUND

Currently, commercial aircraft employ guidance systems that warn pilots when the aircraft is deviating from a flight path. Guidance systems must have certain levels of accuracy, integrity, continuity, and availability during ordinary flight. Guidance systems that are used for landing require additional levels of accuracy, integrity, continuity, and availability. Landing systems typically provide high precision data relating to position and deviation of an aircraft from a landing approach path. This high precision often requires special equipment, which can be beneficial in situations where fog, clouds, and/or other conditions reduce visibility.

Airport landing systems are categorized by the Federal Aviation Administration (FAA) or other certification authority into different categories (Category I, II, and III) depending upon levels of accuracy, integrity, continuity, and availability provided by the landing guidance system. Accuracy refers to a volume that a position fix is contained within ninety-five percent certainty. Integrity refers to the probability that the system will unintentionally provide hazardous misleading information, such as an undetected fault or lack of information. Integrity also refers to a time required for a detected fault to be flagged by the system. Continuity refers to the probability that the navigation accuracy and integrity requirements will remain supported during the approach.

Most airport landing systems fall in Category I (CAT I), which enables the aircraft to initiate approach procedures from a decision height (DH) of 200 feet. The decision height represents the lowest altitude, above the touchdown zone; the aircraft can descend to without the pilot making visual contact with the runway. In a CAT I landing, if the pilot has not made visual contact with the runway by the time the aircraft descends to 200 feet, then the pilot must abort the landing and try again. Also, for a CAT I landing, the plane has to be in a runway visual range (RVR) of at least 1800 feet, which means that the pilot must also make visual contact with the start of a center line of a runway with no less than 1800 feet to the runway. In other words, if the aircraft attempting a CAT I approach is located at least 200 feet above the runway (DH) and at least 1800 feet from the start of the runway (RVR) and the pilot is able to make visual contact with the runway by that point, then the aircraft can continue with the CAT I approach. Otherwise, the aircraft should abort the landing.

More restrictive than the CAT I landing is a Category II (CAT II) landing, where airport landing systems allow the aircraft to initiate approach procedures from a DH of at least 100 feet and a RVR of at least 1200 feet. An aircraft that is capable of a CAT II landing is able to descend below the CAT I landing requirements before making a decision whether to land or abort the landing. In a CAT II approach, the DH is located at least 100 feet above the runway and the RVR is at least 1200 feet from the start of the runway.

Airport landing systems categorized for CAT III, like the system currently found at John F. Kennedy International Airport, allow for landing procedures from a DH of at least 50 feet and a RVR of at least 650 feet. In an aircraft capable of a CAT III approach, the DH is located at least 50 feet above the runway and the RVR is at least 650 feet from the start of the runway.

Aircraft configured for CAT III landings require special automatic landing or guidance systems, such as a triple redundant autopilot system, and must meet stringent levels of integrity and reliability. Generally, only a few airports have the equipment necessary for CAT III landings because implementation of such equipment requires special surveying. In addition, limited aircraft crews have the requisite training to perform the CAT III landings, such as the requisite simulator training, for example. Due to these limitations, CAT I landing systems and approaches tend to be the predominant methods used in smaller or private airplanes.

One of the landing systems used throughout the world for high precision landing guidance and deviation data is an instrument landing system (ILS), which includes a transmitter located on the ground to project two sets of radio beams into space along the approach corridor. An aircraft equipped for an ILS landing includes specialized antennas and receivers that interpret the radio beams and provide the pilot with navigational guidance. One of the radio beams provides lateral guidance, which allows the pilot to align the aircraft with the runway. A subsystem associated with the lateral guidance is called the localizer. The other radio beam provides vertical guidance. The subsystem associated with the vertical guidance is called a glideslope and it provides guidance for a steady descent into the airfield. The combination of the localizer and the glideslope effectively defines an approach path for an aircraft to fly along during a landing. The approach path is often referred to as an ILS approach. Depending on the configuration and equipment used, ILS is capable of CAT I, II, and III landings.

Another guidance system used for landings is a Wide Area Augmentation System (WAAS). WAAS is a system using both a ground-based component and a GPS satellite component in order to determine both the lateral and vertical position of the aircraft during a landing approach. The ground-based component may comprise a number of dispersed ground monitoring stations, while the GPS satellite component may comprise a constellation of between twenty-four and thirty-two Medium Earth Orbit satellites. The satellites transmit precise microwave signals that are received by GPS receivers on an aircraft to determine current location, time, and velocity of the aircraft.

The navigational data provided by a WAAS is used with a Localizer Performance with Vertical Guidance (LPV). The LPV is a high precision GPS (WAAS enabled) aviation instrument approach procedures that assists in determining a lateral position and a vertical position of the aircraft. Similar to an ILS approach, the LPV defines the approach path (referred to as an LPV approach) for the aircraft to fly during an approach to a given airport. The LPV approaches (for airports that have defined LPV approaches) are contained in a database that is used by the aircraft and the WAAS to generate deviation and guidance data for an LPV approach. In most cases, the FAA has defined the LPV approaches such that they match existing ILS approaches. Currently, WAAS is only qualified for a CAT I landing and is currently unable to execute by a CAT II or III landing.

SUMMARY

In one embodiment of the invention, a low visibility landing system may integrate a first signal from a first landing system and a second signal from a second landing system to generate a hybrid signal that has a greater accuracy than the first signal or second signal individually. For example, a hybrid signal may be generated from an ILS signal and a WAAS signal. In some cases, the use of a hybrid signal may allow an aircraft to lower the DH and the RVR, which would provide pilots the ability to descend further before having to abort a landing in poor visibility conditions. The hybrid signal may provide deviation and guidance data to the aircraft so that the pilot or autopilot will be able to properly position the aircraft along an approach path during landing. As in a conventional landing system employing only ILS or only WAAS, for example, if the deviation of the aircraft from the landing approach exceeds a certain threshold, then the pilot may be need to abort the landing approach.

In another embodiment of the invention, a low visibility landing system may generate a hybrid signal for deviation and guidance data, as discussed above, and also monitor the difference between the first signal from the first landing system and the second signal from the second landing system to provide additional levels of accuracy, integrity, continuity, and availability. For example, if the difference between the first signal and the second signal becomes too large, exceeding a threshold, then the system may alert the pilot to a possible failure or automatically require the pilot to abort the landing and try again. Additionally, the system could be configured such that if the difference between the first signal and the second signal exceeds a predetermined threshold, then the landing system may instruct the pilot to abort the landing approach.

In another embodiment of the invention, a low visibility landing system may use a first signal from a first landing system as a primary signal in a conventional manner. In addition, the system would then monitor the difference between the first signal from the first landing system and a second signal from a second landing system to provide additional levels of accuracy, integrity, continuity, and availability. In particular, the landing system may be configured to determine the difference between the primary signal and the second signal as a redundancy measure to check the operation of the primary signal. If the second signal deviates from the primary signal by the predetermined threshold, the landing system may alert the pilot and/or require that the pilot abort the landing and try again. The system could also be configured such that if the difference between the primary signal and the secondary signal exceeds a threshold, then the pilot would be alerted and may need to abort the landing. Additionally, if the deviation of the aircraft from the approach path (such as the deviation of the aircraft from an ILS approach) generated by the second system exceeds a threshold, then the pilot could be alerted.

In one embodiment of the invention, a landing system for an aircraft comprises: a first navigational device to generate a first navigational signal representative of a deviation of an aircraft from a first predetermined landing approach plan; a second navigational device to generate a second navigational signal representative of a deviation of the aircraft from a second predetermined landing approach plan, the second predetermined landing approach plan being different from the first predetermined landing approach plan; and a flight computer to combine the first navigational signal and the second navigational signal to produce a hybrid signal, the flight computer providing guidance for the aircraft based on the hybrid signal In another embodiment of the invention, a landing system for an aircraft comprises: a first navigational device to generate a first navigational signal representative of a deviation of an aircraft from a first approach; a second navigational device to generate a second navigational signal representative of a deviation of the aircraft from a second approach; and a flight computer to provide guidance to a pilot in directing the aircraft onto a predetermined landing approach plan, the flight computer alerting a pilot to abort a landing approach if a difference between the first navigational signal and the second navigational signal exceeds a first predetermined threshold.

DETAILED DESCRIPTION

Figure 1:
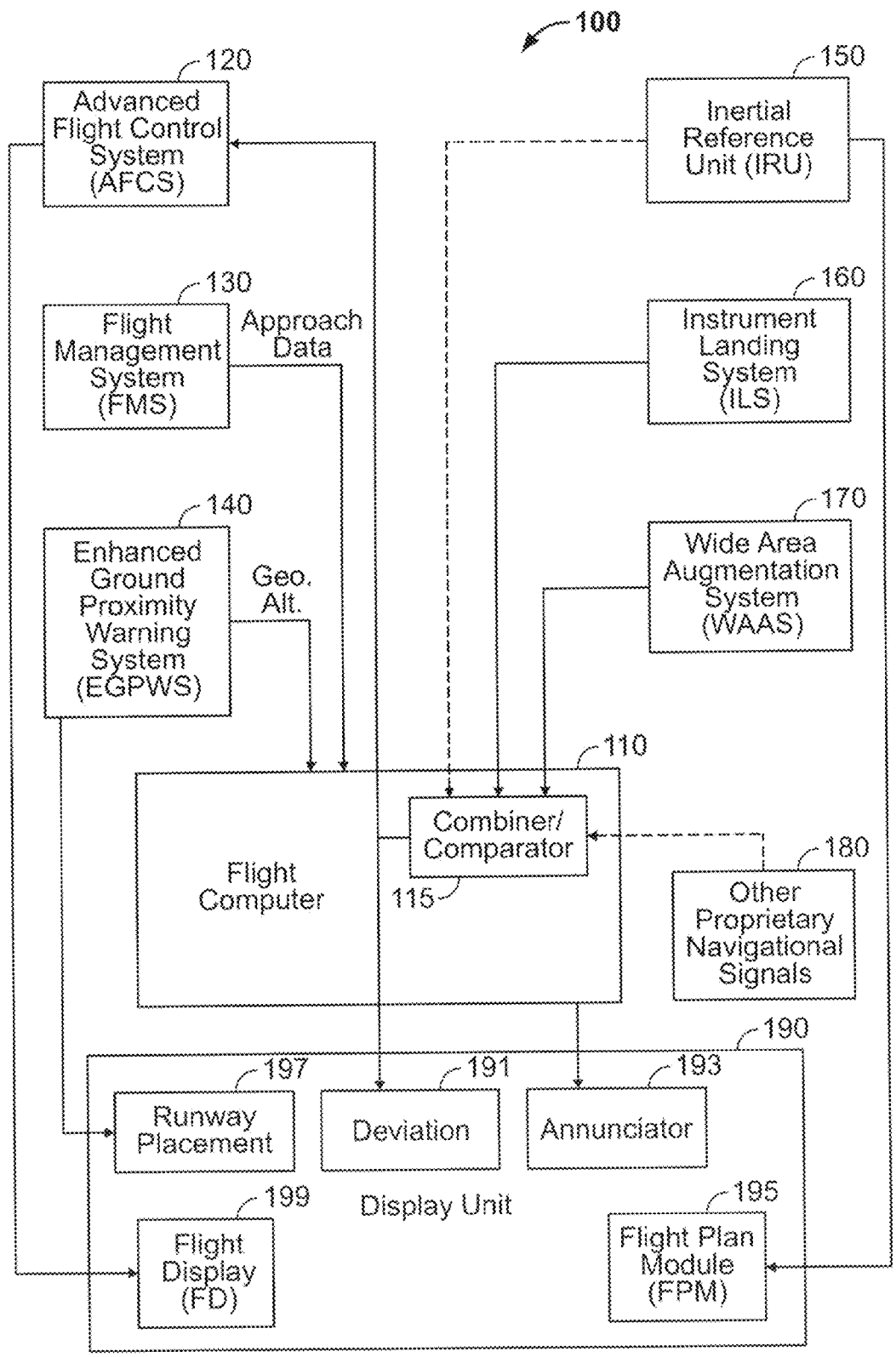
FIG. 1 is an example of a block diagram for a low visibility landing system in accordance with an embodiment of the present invention.

CAT I, CAT II, and CAT III landing approaches use high precision landing systems that may employ different ground, satellite, and aircraft based equipment to aid in landing the aircraft. In at least one embodiment of the invention, a low visibility landing system may be configured such that aircraft landing approaches may proceed to lower altitudes for a decision height (DH) and to a closer distance for before the runway visual range (RVR). In some cases, embodiments of the present invention may utilize equipment configured for CAT I landings and use the equipment to execute a landing procedure with lower DH and RVR than would be possible under conventional CAT I landing procedures.

In one embodiment of the invention, a low visibility landing system may be configured to generate a hybrid signal from the separate signals of two landing systems. For example, the landing system may use the signals from an Instrument Landing System (ILS) and a Wide Area Augmentation System (WAAS) to generate a hybrid signal.

Because the landing approach plans for the ILS and the LPV generally coincide and because the ILS and the WAAS both produce signals indicative of the lateral and the vertical deviations of the aircraft from the ILS approach and LPV approach, respectively, then the ILS and WAAS signals may be combined to form a hybrid signal representative of the lateral and vertical deviations of the aircraft from the airport approach path. The landing approach for either ILS, WAAS, or other systems may include data representative of lateral and vertical velocities along the landing approach. It would be understood in the art that the hybrid signal may also represent lateral and vertical velocities of the aircraft. In addition, in the event the landing approach plans for the ILS and those for the LPV do not coincide, the difference between the ILS and WAAS signals will exceed the predetermined threshold, alerting the pilot that an error has been made.

According to one embodiment of the invention, the hybrid signal may be generated using the ILS and WAAS signals. The hybrid signal comprises the lateral and vertical components ($H_{HYB}$ and $V_{HYB}$) determined according to the following formulas:

$$H_{HYB} = \left(\frac{\sigma^2_{ILS-H}}{\sigma^2_{ILS-H} + \sigma^2_{WAAS-H}}\right) H_{WAAS} + \left(\frac{\sigma^2_{WASS-H}}{\sigma^2_{ILS-H} + \sigma^2_{WAAS-H}}\right) H_{ILS}$$

$$V_{HYB} = \left(\frac{\sigma^2_{ILS-V}}{\sigma^2_{ILS-V} + \sigma^2_{WAAS-V}}\right) V_{WAAS} + \left(\frac{\sigma^2_{WAAS-V}}{\sigma^2_{ILS-V} + \sigma^2_{WAAS-V}}\right) V_{ILS}$$

$H_{WAAS}$ and $H_{ILS}$ represent the lateral or horizontal signals as provided by the WAAS and ILS, while $V_{WAAS}$ and $V_{ILS}$ as represent the vertical signals as provided by the WAAS and ILS.

The standard deviations ($\sigma_{ILS}$ and $\sigma_{WAAS}$) for ILS and WAAS signals may be calculated by using published accuracies for CAT I ILS and WAAS approaches and assuming the errors conform to a Gaussian distribution. The standard deviations of the lateral and vertical values of the ILS and WAAS systems ($\sigma_{ILS-H}$, $\sigma_{ILS-V}$, and $\sigma_{WAAS-V}$) may also similarly calculated. Using this information, the accuracy of the horizontal and the vertical components of the hybrid signal may be calculated as a function of the standard deviations according to the following equations.

$$\sigma_{HYB-H} = \left(\frac{1}{\frac{1}{\sigma^2_{ILS-H}} + \frac{1}{\sigma^2_{WAAS-H}}}\right)^{\frac{1}{2}}$$

$$\sigma_{HYB-V} = \left(\frac{1}{\frac{1}{\sigma^2_{ILS-V}} + \frac{1}{\sigma^2_{WAAS-V}}}\right)^{\frac{1}{2}}$$

The standard deviations of the hybrid signal may be less than either or both of the standard deviations of the ILS and the WAAS, reflecting the additional stability generated by the hybrid signal in comparison to the separate ILS or WAAS signal.

One of ordinary skill in the art would appreciate that there are additional methods and formulas for calculating the horizontal and the vertical components of the hybrid signal and their corresponding measures of accuracy.

By combining the signals in the manner described above, the hybrid signal representative of the lateral and vertical deviations of the aircraft from the airport approach path may have a greater accuracy and stability than either the WAAS signal or the ILS signal individually. Because of the greater accuracy and stability of the hybrid signal, the landing system may be able to descend further during a landing approach without visual contact with the runway, possibly allowing the aircraft to perform a CAT II or similar landing using equipment (the WAAS or the ILS) that typically would only be able to perform a CAT I landing.

The hybrid signal may then be used by the aircraft avionics system and the pilots in a similar manner to how a conventional system would use a signal from an ILS or a WAAS separately. As would be understood by those of skill in the art, if the horizontal or vertical deviation of the aircraft (according to the hybrid signal) exceeds a predetermined threshold, then the landing system may alert the pilot to abort the landing. The predetermined thresholds may be derived from FAA publications for allowable deviations along either the ILS or the WAAS landing approach plans, for example. The predetermined thresholds may be a function of the location of the aircraft along the approach path. For example, as the aircraft gets closer to the runway, the predetermined threshold may decrease, representing a lower tolerance of a deviation from the predetermined landing approach plan. The predetermined thresholds may be set less than the FAA publications for allowable deviations.

The deviation represented by the hybrid signal may anticipate and warn against, for example, short landings, long landings, wide landings, and an excessive sink rate, and appropriately cue the pilot to execute a missed approach, if necessary. Short landings occur when the aircraft does not make it to the runway, while long landings occur when the aircraft lands too far down the runway, thus preventing the ability to slow the aircraft appropriately before the runway ends. A wide landing occurs when the aircraft misses the runway to the side. An excessive sink rate occurs when the aircraft descends at too quick of a rate, causing the aircraft to land with excessive force. As one of ordinary skill in the art would appreciate, the deviation of the aircraft (according to the hybrid signal) may also provide guidance to the pilot or an autopilot regarding how to direct the aircraft back into alignment with the proper landing approach.

In another embodiment of the invention, a landing system may again be configured to integrate a signal from a WAAS with a signal from an ILS to create a hybrid signal as discussed above. In addition, the landing system may monitor or cross-monitor the signals from the WAAS and the ILS by determining the difference between the lateral signals and vertical signals for the WAAS and the ILS. For example, the landing system may monitor the difference between the lateral signals and the difference between the vertical signals for the WAAS and ILS to determine if the differences exceed any predetermined thresholds. It is contemplated that the thresholds for the allowed difference between the horizontal or lateral signals may be different than the allowed thresholds for the difference between the vertical signals.

So long as the difference between the WAAS and ILS signals does not exceed a threshold, the landing system may display the deviation (according to the hybrid signal) of the aircraft from the approach path to the pilot, and provide guidance (according to the hybrid signal) to the pilot or autopilot to direct the aircraft back into a proper alignment with the runway for landing. Should the difference between the WAAS and ILS signals exceed a threshold, the landing system may be configured to alert the pilot. If the system determines that either the ILS or WAAS signal has failed, then the system may determine whether the pilot can continue under the remaining valid system. For example, if the system determines that the ILS signal has failed, the aircraft may continue its landing approach using the WAAS system alone. It is also contemplated that if only the difference between the lateral signals (or the difference between the vertical signals) exceeds its predetermined threshold, then the landing system may alert the pilot.

In another embodiment of the invention, a low visibility landing system may be employed that uses one landing system as a primary system, while monitoring the primary system with another landing system to verify the integrity of the primary system. For example, the landing system may comprise a WAAS for generating a primary signal for deviation and guidance data. The landing system may then use an ILS to monitor or cross-monitor the primary signal. The primary signal and primary landing system could then be used in a conventional system using a single landing system. Alternatively, the ILS may be used as the primary signal and the WAAS may be used to monitor the ILS.

To monitor the primary signal, the landing system may utilize, for example, the ILS signal. As discussed above, the system may monitor whether the difference between the ILS signal and the WAAS signal (for both horizontal and vertical deviations) exceeds any predetermined thresholds. Although the primary signal used in this embodiment of the invention may involve an existing landing system, such as WAAS, the monitoring or cross-monitoring may provide additional redundancies to the primary signal such that the aircraft may descend further during the landing approach without visual contact with the runway. Such an arrangement may allow the aircraft to perform a CAT II or similar landing using equipment (the WAAS or the ILS) that typically would typically only be able to perform a CAT I landing.

FIG. 1 illustrates a low visibility landing system 100 and various aircraft avionics that could implement embodiments of the present invention. As would be apparent to those of skill in the art, other arrangements of components and combinations of different components could be used to implement embodiments of the invention without deviating from the scope and spirit of the present invention.

As shown in FIG. 1, the landing system 100 may include a flight computer 110, an Advanced Flight Control System (AFCS) 120, a Flight Management System (FMS) 130, an Enhanced Ground Proximity Warning System (EGPWS) 140, an Inertial Reference Unit (IRU) 150, an Instrument Landing System (ILS) 160, a Wide Area Augmentation System (WAAS) 170, and a display unit 190. The FMS 130 may be configured to provide to the flight computer 110 data regarding a landing approach plan, while the EGPWS 140 may provide the flight computer 110 with a geometric altitude, where the geometric altitude represents a three-dimensional model of terrain. Other devices 180 may optionally (as denoted by the dashed line) provide additional navigational signals to the flight computer 110, such as proprietary navigation data and proprietary systems. In addition, the devices 180 may include other non-proprietary landing systems, such as, for example, an VHF omni-directional range (VOR) equipment; a non-directional beacon (NDB) system; a radio altimeter; and a microwave landing system (MLS). Display unit 190 may display information regarding any failures of the navigational devices and/or the status of the aircraft.

Combiner/Comparator 115 located within flight computer 110 may receive signals from different systems, such as the IRU 150, the ILS 160, and the WAAS 170, for example. The signals from the IRU 150, the ILS 160 and the WAAS 170 may represent a signal fed into the combiner/comparator 115. One of ordinary skill in the art would appreciate that the ILS or WAAS signal may be the result of multiple signals from multiple ILS or WAAS systems combined into a single ILS or WAAS signal. In addition, it would be understood in the art that it is possible that both an ILS signal and a WAAS signal may be generated by a single navigational instrument capable of housing both an ILS and a WAAS, such as, for example, a Garmin 430W manufactured in Wichita, Kans.

Referring to the those embodiments of the invention discussed above that use a hybrid signal, the combiner/comparator 115 may be configured to produce a hybrid signal from two separate landing systems, such as, for example, the ILS 160 and the WAAS 170. The combiner/comparator 115 may also cross-monitor the signals from the WAAS 170 and the ILS 160 to determine if the difference exceeds a certain threshold. If so, the combiner/comparator 115 and the flight computer 110 may output a signal that will alert the pilot to the difference between the signals.

Also, referring to at least one embodiment of the invention, the combiner/comparator 115 may be used to determine the difference between two signals from two separate landing systems, such as, for example, the signal from the ILS 160 and the signal from the WAAS 170. The combiner/comparator 115 may use the signal generated by the WAAS 170 as a primary signal and use the signal from ILS 160 to monitor the integrity of the WAAS signal. If the difference between the signal from the ILS 160 and the signal from the WAAS 170 exceeds a certain threshold, the combiner/comparator 115 outputs a signal that are later used to instruct the pilot to abort the landing. As previously stated, the threshold may be derived from FAA publications detailing allowable deviations from the ILS or WAAS landing approach plans.

The flight computer 110 receives the hybrid signal (or the primary signal as discussed above with reference to some embodiments of the invention) from the combiner/comparator 115. In some cases, the FMS 130 may be configured to provide LPV approaches to the flight computer 110 and the WAAS 170. The flight computer 110 provides the deviation to a deviation display 191 within the display unit 190 to indicate to the pilot how far the aircraft deviates from the landing approach plan. The flight computer 110 and the AFCS 120 collaborate in order to provide proper instructions to the pilot in order to direct the aircraft back along the landing approach plan. One of ordinary skill in the art would appreciate that the AFCS 120, the FMS 130, and the EGPWS 140 may be disposed within the flight computer 110 or within other avionics shown in FIG. 1 or on in an aircraft.

In accordance with at least one embodiment of the invention, if the flight computer 110 and/or the combiner/comparator 115 determine that the signals received from the various navigational systems indicate potential failure of one or more systems, then the system could be configured to automatically alert the pilot. For example, the flight computer 110 could send a signal to an annunciator 193 within the display unit 190 to notify a pilot of such a failure. In at least one embodiment of the present invention, a WAAS signal, and an ILS signal, the annunciator 193 within the display unit 190 may have three announcements on an annunciator board installed in the view of the crew: a hybrid fail announcement, an ILS fail announcement, and a WAAS fail announcement. The hybrid fail announcement may be displayed to the pilot if the hybrid signal indicates that deviation of the aircraft in excess of a predetermined threshold. The ILS fail announcement may be displayed to the pilot if the ILS signal indicates that the aircraft has deviated from the landing approach plan by a predetermined threshold, or if the flight computer 110 determines that the ILS signal deviates from the WAAS signal by a predetermined threshold. Similarly, the WAAS fail announcement may be displayed to the pilot if the WAAS signal indicates that the aircraft has deviated from the landing approach plan by a predetermined threshold, or if the flight computer 110 determines that the WAAS signal deviates from the ILS signal by a predetermined threshold.

The display unit 190 may also receive information from various systems to provide additional information to the pilot. For example, the IRU 150 may optionally provide (as illustrated by a dashed line) a measure of the rate of descent or ascent in terms of feet per minute, with a flight plan module (FPM) 195 the display unit 190 displaying that information to the pilot. Also, the EGPWS 140 may generate information for a runway placement display 197 to the pilot regarding the position of the aircraft with respect to the runway, such that the pilot may be able to make the appropriate adjustments to ensure that the aircraft is in proper alignment with the runway. In addition, the AFCS 120 may provide to the display unit 190 information sufficient to serve as a flight display 199, such as, for example, attitude of the aircraft, speed, altitude and other flight characteristics known to those of skill in the art.

The boxes shown in FIG. 1 are representative of software and/or hardware modules capable of implementation in a variety of configurations. For example, flight computer 110 and the combiner/comparator 115 may comprise a software module or software modules that run in a display unit 190. Alternatively, the flight computer 110 and the combiner/comparator 115 may also comprise a hardware module or hardware modules.

Figure 2:
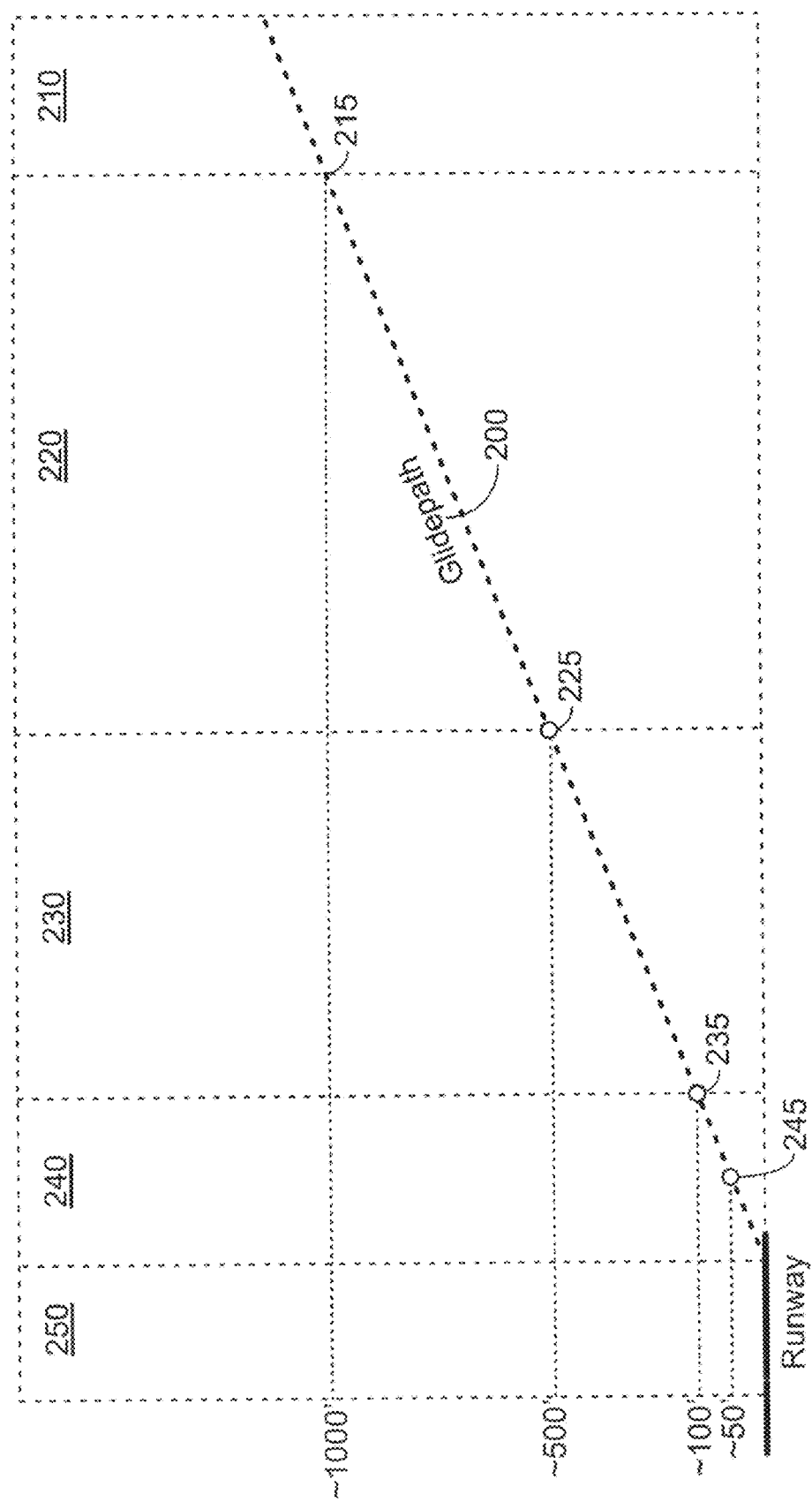
FIG. 2 illustrates a landing approach of an aircraft in accordance with an embodiment of the present invention.

FIG. 2 illustrates an approach of an aircraft along glide path 200 utilizing the system in accordance with at least one embodiment of the invention. Segment 210 of the glide path 200 represents the part of the path where the aircraft would start generating a hybrid signal.

At point 215 of the glide path, approximately 1000 feet above the runway, the advanced flight control system (AFCS) 120 in FIG. 1 may be configured to use the hybrid signal to provide the pilot or the autopilot the necessary guidance to correct the deviation of the aircraft and align the aircraft with the landing approach plan.

At point 225 of the glide path, approximately 500 feet above the runway, the flight computer 110 may begin receiving a signal from a radio altimeter shown as the other proprietary navigational signal in FIG. 1, which provides another possible confirmation of position of the aircraft relative to the runway. As understood by those of skill in the art, the radio altimeter may utilize X-band weather radar technology and the aircraft may begin to receive the radio altimeter signal before the aircraft descends below decision heights for Category I approaches.

During segment 230 of the glide path, the hybrid signal may provide guidance for the approach. It is during this segment of the glide path that a pilot may make visual contact with the runway for a CAT I or II landing. At point 235 of the glide path, approximately 100 feet above the runway, the EVS may provide a confirmation signal regarding the alignment of the flight path with the runway. In addition, use of the EVS may result in enhanced runway light detection, enhanced situational awareness, and visibility during the flare and rollout portions of the flight. During segment 240 of the glide path, the pilot may use the inertial readings from the inertial reference unit (IRU) 150 and radio signals from the radio altimeter to manually continue with the landing approach. At point 245 of the glide path, approximately 50 feet above the runway, the pilot may visually make a decision with respect to landing or aborting the landing. During segment 250 of the glide path, the pilot manually performs rollout of the aircraft.

It is also contemplated that systems in accordance with embodiments of the invention may also operate as a rollout performance monitor. For example, a landing system in accordance with embodiments of the invention may provide a distance of remaining runway and distance to exit data to the pilot to aid in preventing the aircraft from going past the runway or missing any turns when the aircraft is taxing to a gate.

Figure 3:
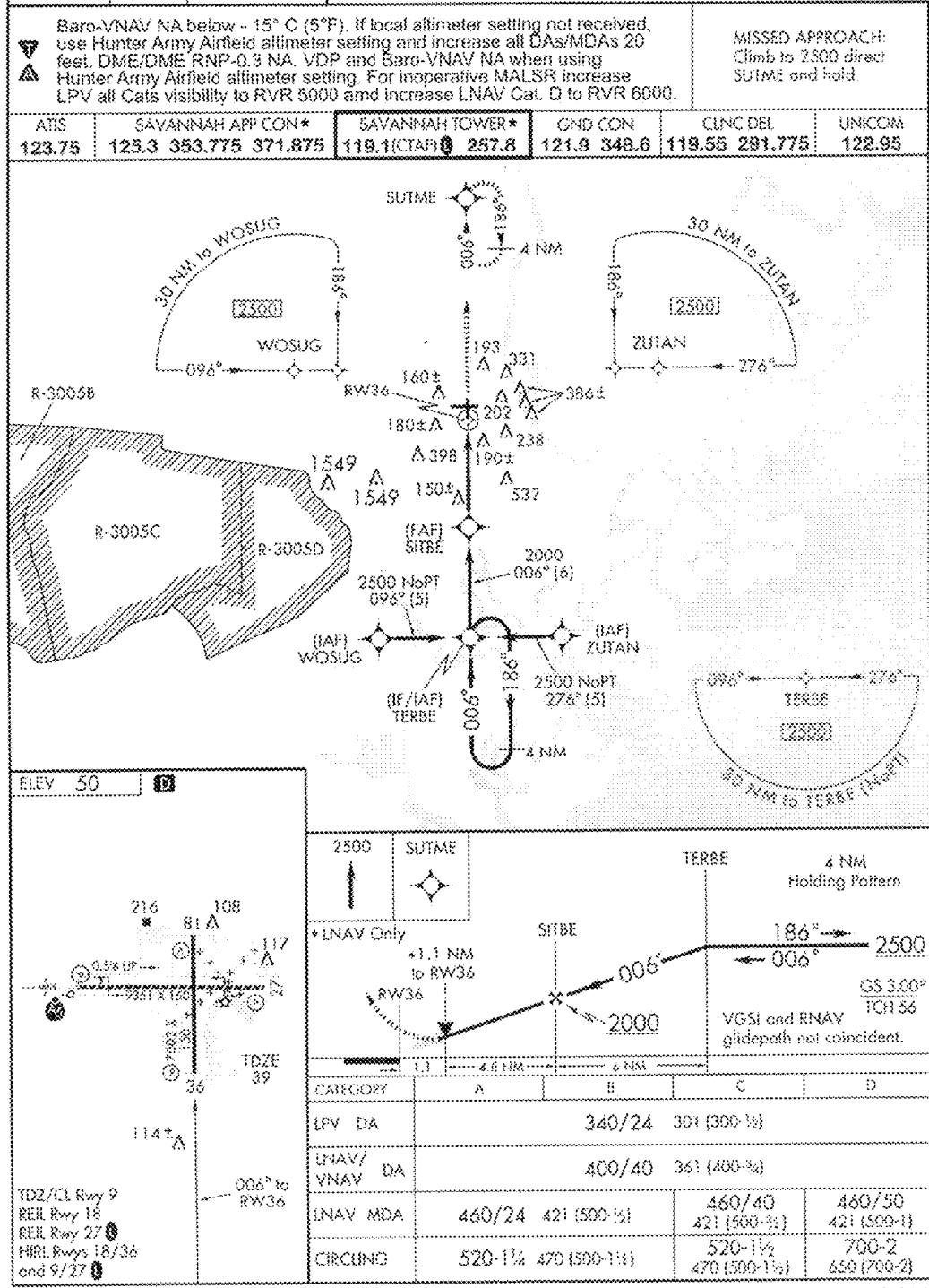
FIGS. 3 and 4 illustrate predetermined landing approaches into Savannah/Hilton Head International Airport.
Figure 4:
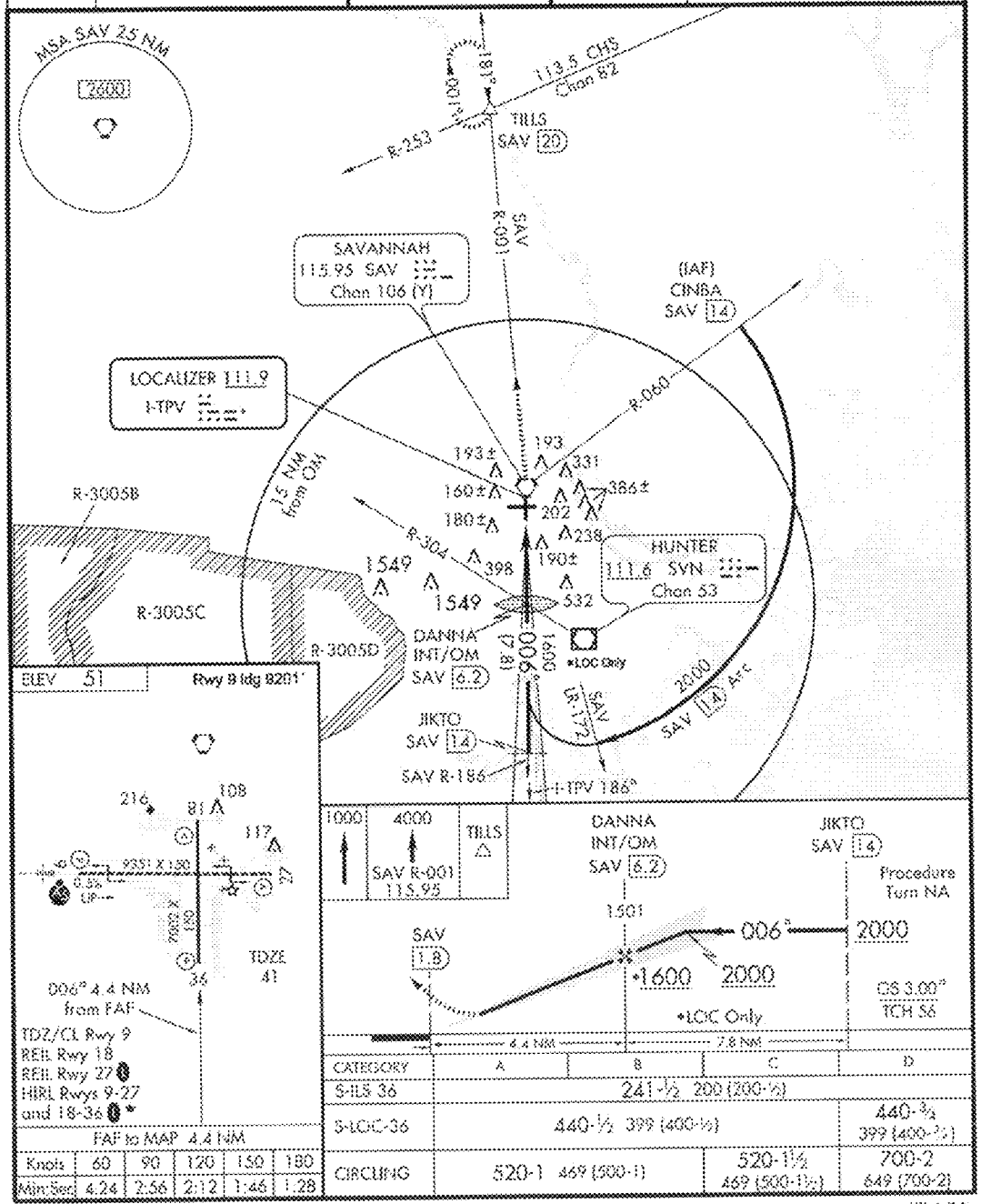

FIG. 3 illustrates an appropriate flight plan of a GPS-based area navigation for a LPV-based landing into Savannah/Hilton Head International Airport, while FIG. 4 illustrates an appropriate flight plan of an ILS device for a landing into the same airport. Without the information provided by at least one embodiment of the invention, pilot may have to either memorize the flight plan or have a flight plan handbook. The flight plan for the LPV approach shows that the decision altitude is 340 feet above the runway. In other words, a plane with a WAAS can descend to 340 feet before making a decision to land or initiate a go-around based on whether the pilot makes visual contact with the runway. The flight plan for the ILS device shows that the decision altitude is 241 feet above the runway. Similarly, this means that a plane with an ILS device can descend to 241 feet before making a decision to land or initiate a go around.

Figure 5:
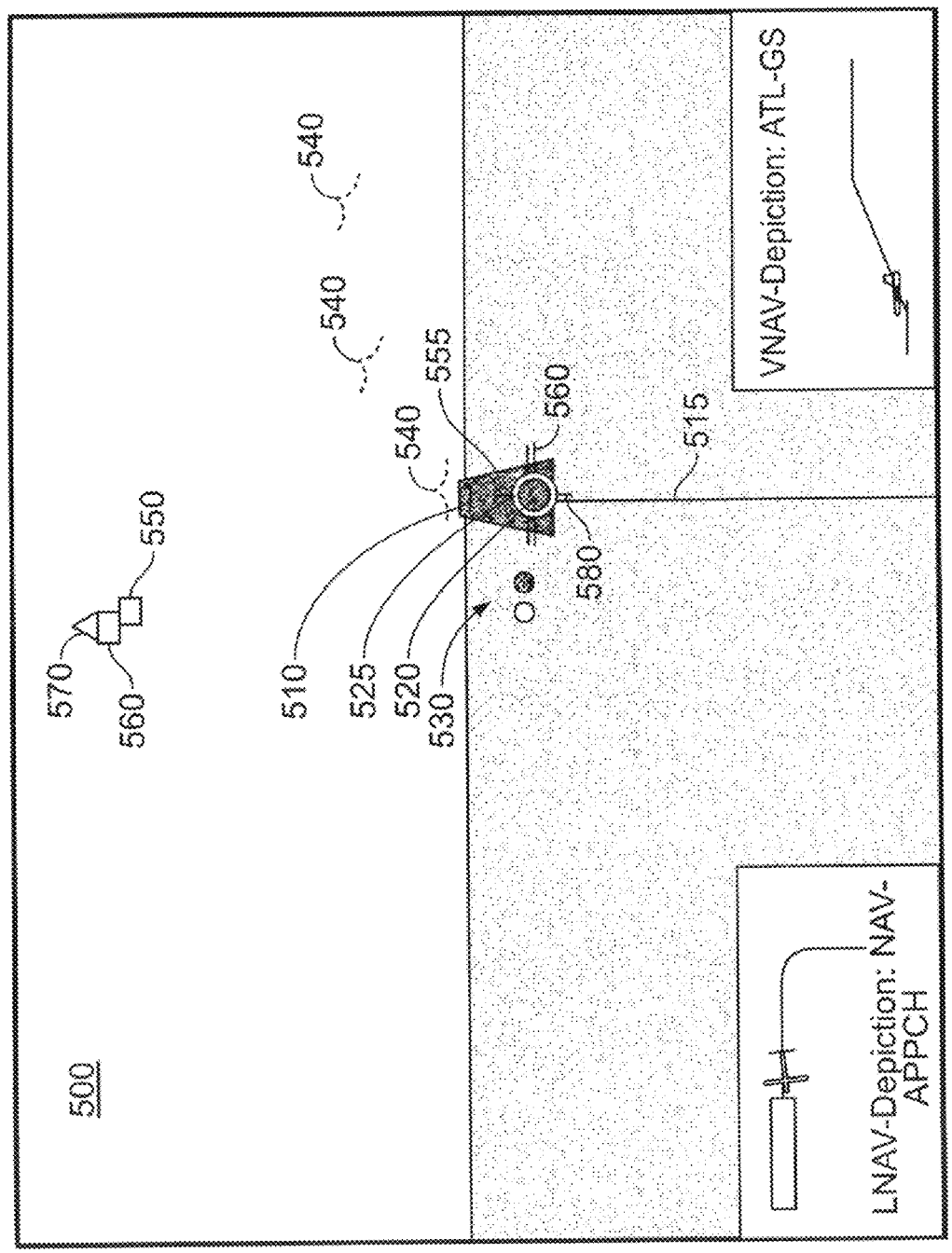
FIG. 5 illustrates how the data from a low visibility landing system in accordance with an embodiment of the present invention could be displayed on an aircraft display.

FIG. 5 illustrates an image 500 generated on the display unit 190 to show the deviation (according to the hybrid signal in some embodiments of the invention and according to the primary signal in some embodiments of the invention) of the aircraft from the appropriate flight landing onto runway 510 with an approach lead line 515. A diamond-shaped indicator 520 may represent a current aim direction of the aircraft, while a circular indicator 525 of the flight director may represent an appropriate landing direction according to the predetermined flight plan. Ideally, when landing a plane, the diamond-shaped indicator 520 should directly line up with the circular indicator 525. Synthetic visual approach slope indicator (VASI) 530 may simulate the lights on the side of the runway to provide descent guidance information. The synthetic VASI 530 allows simulation of the red-green-white light systems that commercial pilots normally see on descent to indicate whether the landing slope is too steep or too shallow.

Go-around indicators 540 show a direction that an aircraft may take if the system initiates a go-around. When the system initiates a go-around, the system may require that the pilot take the path as shown by the go-around indicators 540. The go-around indicators may be configured to give the pilot advance notice of what to do in the future. The low visibility system may also include a crab director, which allows for alignment with the runway in order to straighten out the plane if the pilot cannot see the runway. A first crab director indicator 550 and a second crab director indicator 555 may assist in landing the plane in zero visibility or when it is difficult to see the runway. First crab director indicator 550 is shown to be out to the right; this will indicate to the pilot to yaw right. A decrab director 560 may be shown both below a skid indicator 570 and on a flight path marker 580.

With regards to at least one embodiment of the invention, it is contemplated that one of ordinary skill in the art could employ a landing system including an ILS and a WAAS system as discussed above. The landing system would be an ILS Monitored LPV Approach System (IMLAS), where the ILS is used to monitor the operation of the WAAS. It would be apparent to one of ordinary skill in the art that a WAAS could be used to monitor an ILS instead. Referring back to FIG. 1, the WAAS 170 may generate a WAAS signal representative of the deviation of the aircraft from an LPV approach. The WAAS signal could be provided to flight computer 110 and combiner/comparator 115 as a primary signal. An ILS signal from ILS 160 would then be used to monitor the operation of the WAAS in the combiner/comparator 115.

Regardless of the embodiments used, if the deviation of either the ILS or the WAAS signals from the landing approach plan exceeds a threshold, the pilot may be alerted and the landing may be aborted.

Figure 6:
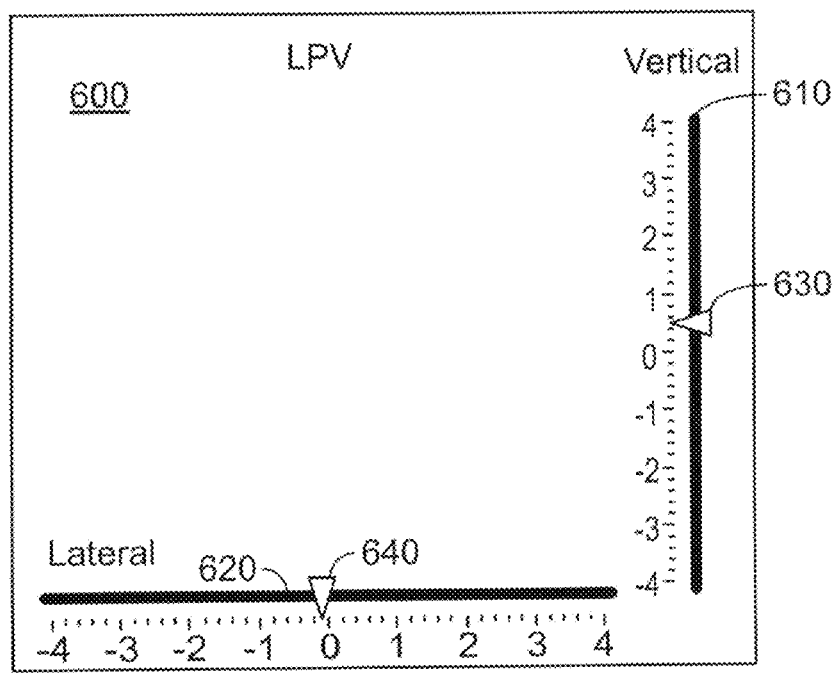
FIG. 6 is an example of a computer display for displaying the output of the low visibility landing system in accordance with an embodiment of the present invention.

FIG. 6 illustrates a graph 600 showing how a WAAS signal may appear to a pilot when the deviation of the aircraft from an LPV approach is displayed. Along the numbered axis 610 is a plot of a vertical position of the LPV approach relative to a vertical course guidance needle 630, which represents a current vertical position of the aircraft. To align the aircraft with the LPV approach, the pilot would fly the aircraft down slightly until the numbered axis would scroll up, aligning the number 0 with the vertical course guidance needle 630. Along the numbered axis 620 is a plot of a lateral position of the LPV approach relative to a lateral course guidance needle 640, which represents a current lateral position of the aircraft. As would be understood by those of skill in the art, a situation where both the vertical course guidance needle 630 and the lateral course guidance needle 640 are at zero indicates that the aircraft is flying along the landing approach plan.

As shown in FIG. 6, the vertical course guidance needle 630 indicates that the vertical deviation of the aircraft is approximately equal to +0.4; while the lateral course guidance needle 640 indicates that the lateral deviation of the aircraft is approximately equal to 0. Because the vertical course guidance needle 630 is at +0.4, the aircraft is currently higher than the recommended altitude of the landing approach plan, so the pilot will lower the altitude of the aircraft to align it with the approach plan. Because the lateral course guidance needle 640 is at 0, the pilot will not have to make any lateral adjustments to the aircraft because the aircraft is currently aligned to the runway.

Figure 7:
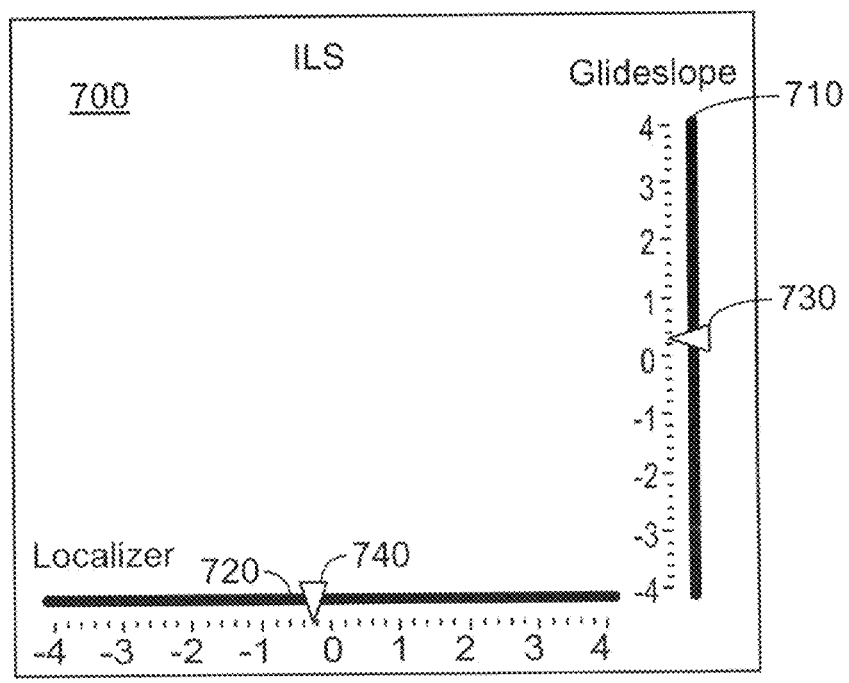
FIG. 7 is an example of a computer display for a low visibility landing system in accordance with an embodiment of the present invention.

Similarly, FIG. 7 illustrates a graph 700 showing how an ILS signal may appear to a pilot when the deviation of the aircraft from an ILS approach is displayed. Along the numbered axis 710 is a plot of the glideslope position of the ILS approach relative to a glideslope course guidance needle 730, which represents a current vertical position of the aircraft. To align the aircraft with the ILS approach, the pilot would fly the aircraft down slightly until the numbered axis would scroll up, aligning the number 0 with the glideslope course guidance needle 730. Along the numbered axis 720 is a plot of a localizer position of the ILS approach relative to a localizer course guidance needle 740, which represents a current lateral position of the aircraft. As would be understood by those of skill in the art, when both the vertical course guidance needle 630 and the lateral course guidance needle 640 are at zero, the aircraft is flying along the landing approach plan.

As shown in FIG. 7, the glideslope course guidance needle 730 indicates that the deviation from the glideslope is approximately equal to +0.2; while the localizer guidance needle 740 indicates that the localizer deviation is approximately equal to −0.2. Because the glideslope course guidance needle 730 is at +0.2, the aircraft is currently higher than the recommended altitude of the landing approach plan, so the pilot will lower the altitude of the aircraft to align the aircraft with the glideslope. Because the localizer guidance needle 740 is at −0.2, the ILS signal indicates that the aircraft is currently to the left of the approach path and the pilot will turn the aircraft to the right to properly align the aircraft with the runway.

Figure 8:
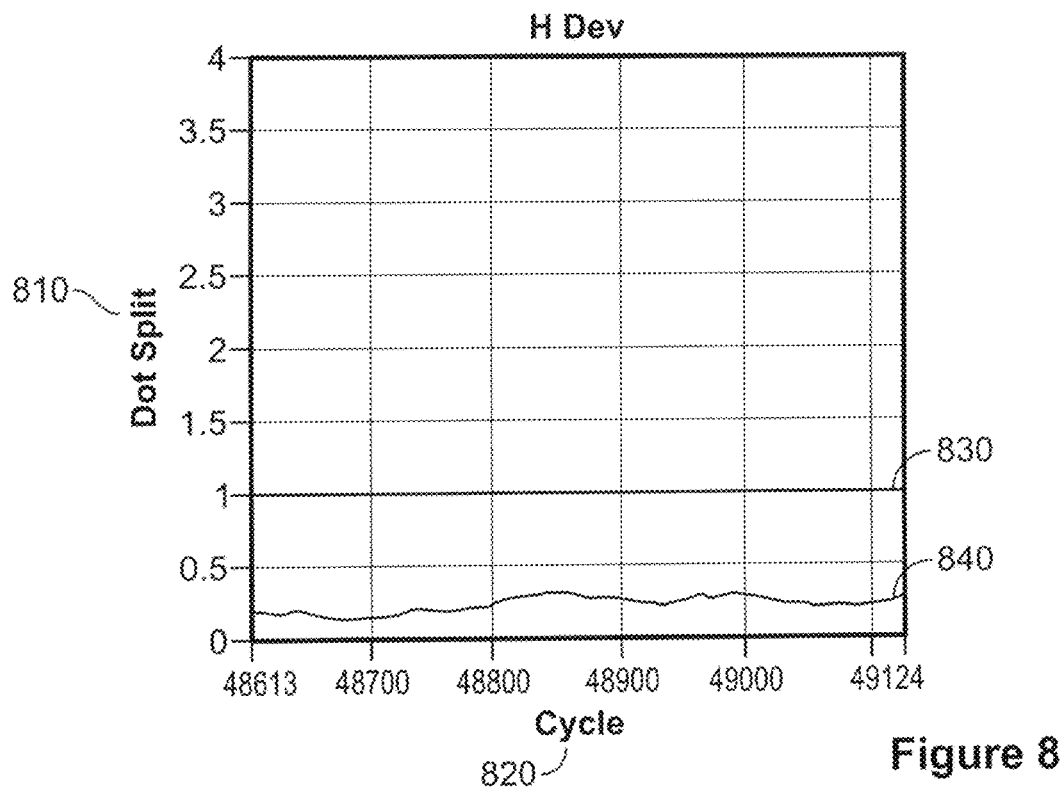
FIG. 8 is another example of a computer display for a low visibility landing system in accordance with an embodiment of the present invention.

As discussed above, differences between the WAAS signal and the ILS signal may be used to monitor the integrity of a hybrid signal or a primary signal, in accordance with embodiments of the invention. FIG. 8 illustrates a graph showing the difference between the lateral component of the WAAS signal (shown in FIG. 6) and a localizer component of the ILS signal (shown in FIG. 7). In FIG. 8, the Y-axis 810 represents the difference and the X-axis 820 represents time. FIG. 8 illustrates how a predetermined threshold 830 can be set, for example, at 1.0. The difference 840 between the lateral component of the WAAS signal and the localizer component of the ILS signal is plotted in FIG. 8. As illustrated in FIG. 8, the difference 840 is less than the predetermined threshold 830. Should the difference 840 exceed the predetermined threshold 830, an alert may be sent to the pilot to abort the landing. The predetermined threshold 830 may be adjusted as a function of the location of the aircraft along the approach path. For example, the predetermined threshold 830 may be reduced as the aircraft descends along the approach path, allowing less difference between the ILS and WAAS signals as the aircraft descends and gets close to the runway.

Figure 9:
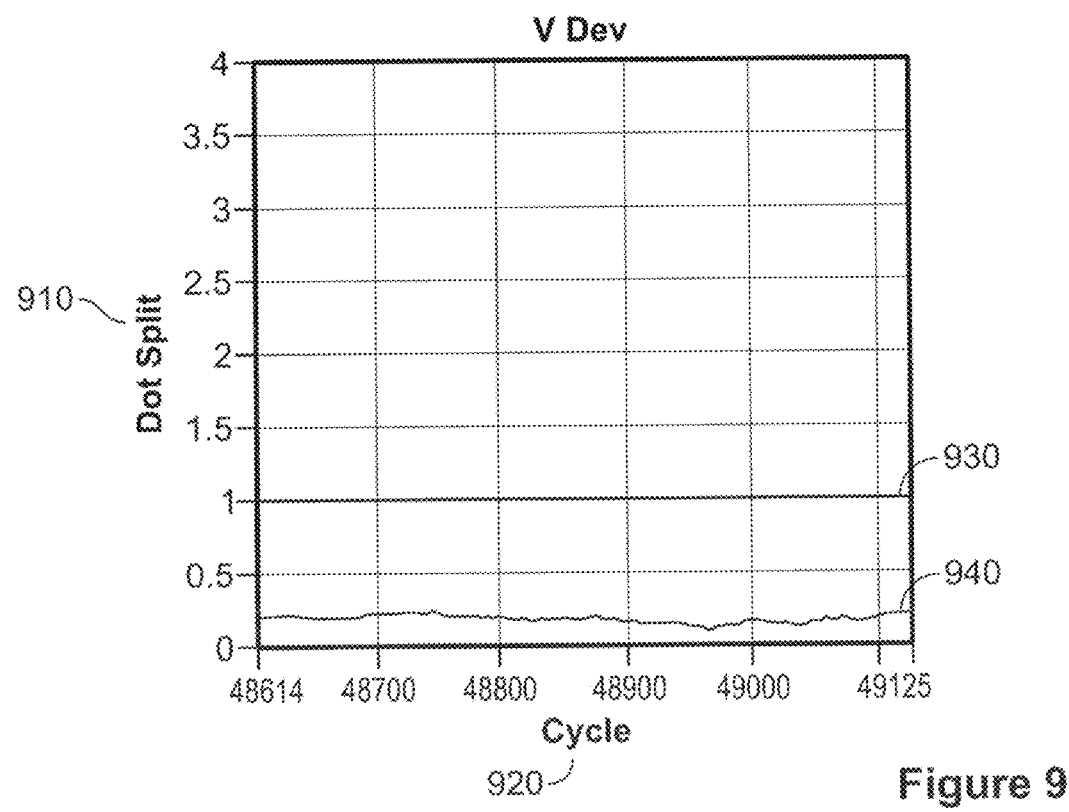
FIG. 9 is another example of a computer display for a low visibility landing system in accordance with an embodiment of the present invention.

Similarly, FIG. 9 illustrates a graph showing the difference between the vertical component of the WAAS signal (shown in FIG. 6) and a glideslope component of the ILS signal (shown in FIG. 7). The Y-axis 910 represents the difference and the X-axis 920 represents time. A predetermined threshold 930 is set and plotted as horizontal line at a value of 1.0. The difference 940 between the vertical component of the WAAS signal and the guideslope component of the ILS signal is plotted in FIG. 9. As illustrated in FIG. 9, the difference 940 is less than the predetermined threshold 930, indicating that an alert will not be sent to the pilot. However, should the difference 940 exceed the predetermined threshold 930 for longer than a predetermined time, an alert may be sent to the pilot to abort the landing. The predetermined threshold 930 may be adjusted as a function of the location of the aircraft along the approach path. For example, the predetermined threshold 930 may be reduced as the aircraft descends along the approach path, allowing less difference between the ILS and WAAS signals as the aircraft descends and gets close to the runway.

Figure 10:
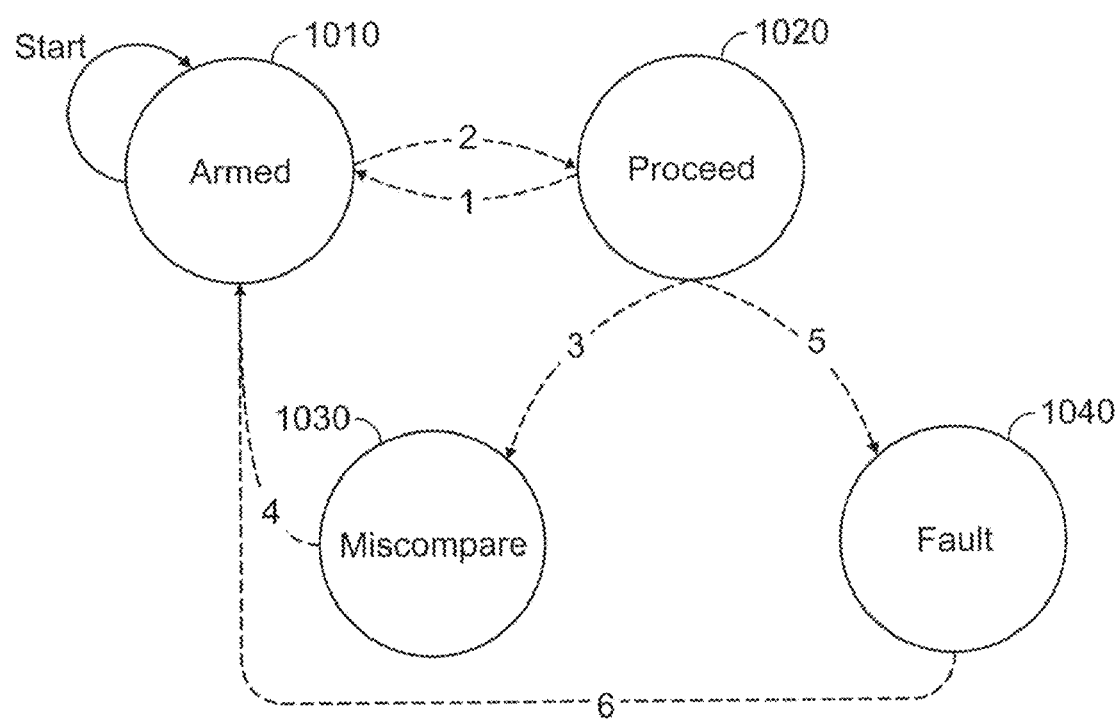
FIG. 10 is an example a flow diagram representing the operation of a low visibility landing system in accordance with an embodiment of the present invention.

FIG. 10 illustrates a flow diagram showing how an IMLAS, as discussed above, may monitor the WAAS and ILS signals and provide alerts in accordance with one embodiment of the invention. For example, an IMLAS may alert a pilot if the difference between the WAAS and ILS signal (including the vertical or horizontal components) exceeds a predetermined threshold. As shown in FIG. 10, the IMLAS starts in an armed state 1010. The armed state 1010 represents a ready state of the IMLAS, where the WAAS signal is monitored by the ILS signal. In the armed state 1010, the ILS 160 and the WAAS 170 (shown in FIG. 1) are generating ILS and WAAS signals for the IMLAS. As an example, the armed state would represent the typical state of the IMLAS when an aircraft is descending for a landing, as shown in sections 210 and 220 of the glidepath 200 illustrated in FIG. 2.

As an example of how the IMLAS operates during a landing approach, the IMLAS may proceed from the armed state 1010 to a proceed state 1020 as shown in step 1, which instructs the pilot to continue with the landing approach if the following conditions are met: (1) the aircraft is on the landing approach plan, for example, glidepath 200 as shown in FIG. 2; and (2) the comparator/combiner 115 and/or the flight computer 110 determine differences between the lateral and vertical components of the ILS and WAAS signals are less than a predetermined threshold. FIGS. 8 and 9 both illustrate a situation where IMLAS would enter into a proceed state 1020 because the horizontal deviation plot and the vertical deviation plot both are under the predetermined threshold 830 and the predetermined threshold 930. In addition, FIG. 6 shows that the aircraft is on the landing approach plan because the primary signal (WAAS signal) indicates that the aircraft does not substantially deviate from the landing approach plan by having values close to zero.

Once in proceed state 1020, the IMLAS may annunciate to the pilots that they may continue with the approach, such as proceeding along sections 230 and 240 of glidepath 200 as shown in FIG. 2. The IMLAS may revert from the proceed state 1020 to the armed state 1010 along step 2 if the pilot aborts the landing or resets the IMLAS into the armed state 1010.

The IMLAS may proceed from the proceed state 1020 to a miscompare state 1030 along step 3 if the comparator/combiner 115 and/or the flight computer 110 of FIG. 1 determines that the differences between the horizontal and vertical components of the ILS and/or WAAS signals exceed the predetermined threshold. In the miscompare state 1030, the IMLAS may reject either the ILS signal or the WAAS signal and may alert the pilots to abort the approach. The IMLAS then transitions to the armed state 1010 along step 4 if the aircraft is no longer on approach or the IMLAS has been manually reset. This could happen when the pilots abort a landing to reattempt a successful landing.

From the proceed state 1020, the IMLAS will transition to a fault state 1040 along step 5 if either the ILS or WAAS signal becomes invalid due to malfunction, error, or other systemic failure of the ILS or the WAAS. The fault state 1040 may also occur when the ILS or WAAS signal indicates deviation from the landing approach plan by a predetermined threshold, resulting in a rejection of the ILS signal or the WAAS signal. Once in the Fault state 1040, the IMLAS transitions back to the armed state 1010 along step 6 if the aircraft is no longer on approach or the IMLAS has been manually reset.

It should be understood that the navigational systems, displays, control systems, control functions, and aircraft systems contemplated under the present invention should not be construed as limited to those examples shown in the Figures. Given the description above, one of ordinary skill in the art would be able to implement embodiments of the invention using other displays, control systems, control functions, and aircraft systems. In addition, the low visibility landing system may also provide guidance to the pilot in take-off operations by providing alignment to the centerline of the runway in very low visibility and also by providing visualization of decision points based upon the amount of runway remaining.

The foregoing descriptions of specific embodiments of the present invention are presented for purposes of illustration and description. They are not intended to be exhaustive or to limit the invention to the precise forms disclosed. Many modifications and variations are possible in view of the above teachings. For example, more than two navigational systems may be employed to generate a hybrid signal. While the embodiments were chosen and described in order to best explain the principles of the invention and its practical applications, thereby enabling others skilled in the art to best utilize the invention, various embodiments with various modifications as are suited to the particular use are also possible. The scope of the invention is to be defined only by the claims appended hereto, and by their equivalents.

What is claimed is:

1. A landing system for an aircraft, comprising:
   a first navigational device to generate a first navigational signal representative of a deviation of the aircraft from a first predetermined landing approach plan;
   a second navigational device to generate a second navigational signal representative of a deviation of the aircraft from a second predetermined landing approach plan, the second predetermined landing approach plan being different from the first predetermined landing approach plan; and
   a flight computer to combine the first navigational signal and the second navigational signal to produce a hybrid signal, the hybrid signal comprising a navigational signal having a greater accuracy than the first navigational signal and the second navigational signal.

2. The landing system of claim 1, wherein providing guidance comprises alerting a pilot to abort a landing approach if the hybrid signal exceeds a first predetermined threshold.

3. The landing system of claim 1, wherein the first navigational device comprises an Instrument Landing System (ILS).

4. The landing system of claim 3, wherein the second navigational device is a Wide Area Augmentation System (WAAS).

5. The landing system of claim 1, wherein the first navigational device comprises a Wide Area Augmentation System (WAAS).

6. The landing system of claim 4, wherein the second navigational device is a an Instrument Landing System (ILS).

7. The landing system of claim 1,
   wherein the flight computer further determines a failure of the first navigational signal if the deviation of the first navigational signal from a first landing approach plan exceeds a second predetermined threshold; and the flight computer further determines a failure of the second navigational signal if the deviation of the second navigational signal from a second landing approach plan exceeds a third predetermined threshold, and
   wherein the flight computer instructing a pilot to abort a landing approach if the flight computer determines at least one of: the failure of the first navigational signal or the failure of the second navigational signal.

8. The landing system of claim 1, wherein the flight computer determines a difference between the first navigational signal and the second navigational signal, the flight computer instructing a pilot to abort the landing if the difference exceeds a predetermined threshold.

9. The landing system of claim 1, wherein the first navigational device and the second navigational device are housed within a single navigational instrument.

10. A landing system for an aircraft, comprising:
    a first navigational device to generate a first navigational signal representative of a deviation of the aircraft from a first approach;
    a second navigational device to generate a second navigational signal representative of a deviation of the aircraft from a second approach; and
    a flight computer to provide guidance to a pilot in directing the aircraft onto a predetermined landing approach plan, the flight computer alerting the pilot to abort a landing approach if a difference between the first navigational signal and the second navigational signal exceeds a first predetermined threshold.

11. The landing system of claim 10, wherein the flight computer is configured to alert the pilot to abort the landing approach if the deviation represented by the first navigational signal exceeds a second predetermined threshold.

12. The landing system of claim 10, wherein the flight computer is configured to alert the pilot to abort the landing approach if the deviation represented by the second navigational signal exceeds a third predetermined threshold.

13. The landing system of claim 10, wherein the first navigational device comprises an Instrument Landing System (ILS).

14. The landing system of claim 13, wherein the second navigational device is a Wide Area Augmentation System (WAAS).

15. The landing system of claim 10, wherein the first navigational device comprises a Wide Area Augmentation System (WAAS).

16. The landing system of claim 15, wherein the second navigational device is a an Instrument Landing System (ILS).

17. The landing system of claim 10, wherein the first navigational device and the second navigational device are housed within a single navigational instrument.

18. A method for landing an aircraft, comprising:
generating a first navigational signal from a first navigational device representative of a deviation of the aircraft from a first predetermined landing approach plan;
generating a second navigational signal from a second navigational device representative of a deviation of the aircraft from a second predetermined landing approach plan;
combining the first navigational signal and the second navigational signal to produce a hybrid signal, the hybrid signal comprising a navigational signal having a greater accuracy than the first navigational signal and the second navigational signal; and
providing guidance for the aircraft based on the hybrid signal.

19. The method of claim 18, further comprising advising a pilot to abort a landing approach if the deviation of the hybrid signal exceeds a first predetermined threshold.

20. The method of claim 18, further comprising:
rejecting the first navigational signal if the deviation represented by the first navigational signal exceeds a second predetermined threshold; and
rejecting the second navigational signal if the deviation represented by the second navigational signal exceeds a third predetermined threshold.

21. The method of claim 18, wherein the first navigational device and the second navigational device are housed within a single navigational instrument.

22. A method for landing an aircraft, comprising:
generating a first navigational signal from a first navigational device representative of a deviation of the aircraft from a first predetermined landing approach plan;
generating a second navigational signal from a second navigational device representative of a deviation of the aircraft from a second predetermined landing approach plan;
guiding the aircraft along the first predetermined landing approach plan based on the first navigational signal; and
alerting a pilot to abort a landing if a difference between the first navigational signal and the second navigational signal exceeds a first predetermined threshold.

23. The method of claim 22, further comprising alerting the pilot to abort a landing approach if the first navigational signal exceeds a second predetermined threshold.

24. The method of claim 22, further comprising alerting the pilot to abort a landing approach if the second navigational signal exceeds a third predetermined threshold.

25. The method of claim 22, wherein the first navigational device and the second navigational device are housed in a single navigational instrument.

\* \* \* \* \*